(12) United States Patent
Adachi et al.

(10) Patent No.: US 7,699,132 B2
(45) Date of Patent: Apr. 20, 2010

(54) MOTORCYCLE BODY FRAME STRUCTURE

(75) Inventors: Eiji Adachi, Saitama (JP); Yuji Noguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 400 days.

(21) Appl. No.: 11/709,231

(22) Filed: Feb. 22, 2007

(65) Prior Publication Data

US 2007/0193805 A1     Aug. 23, 2007

(30) Foreign Application Priority Data

Feb. 23, 2006    (JP)    .............. 2006-047581

(51) Int. Cl.
*B62K 11/04* (2006.01)
(52) U.S. Cl. .................................... 180/219
(58) Field of Classification Search .................. 180/219
See application file for complete search history.

(56) References Cited

U.S. PATENT DOCUMENTS

| | | | | |
|---|---|---|---|---|
| 6,679,347 B2 * | 1/2004 | Iimuro | ....................... | 180/219 |
| 7,270,210 B2 * | 9/2007 | Katsura | ....................... | 180/219 |
| 7,360,619 B2 * | 4/2008 | Adachi et al. | ................ | 180/219 |
| 2001/0030072 A1 * | 10/2001 | Okuma | ....................... | 180/219 |
| 2004/0182634 A1 * | 9/2004 | Adachi et al. | ................ | 180/312 |

FOREIGN PATENT DOCUMENTS

JP    2004-256073 A    9/2004

* cited by examiner

*Primary Examiner*—Lesley Morris
*Assistant Examiner*—Michael R Stabley
(74) *Attorney, Agent, or Firm*—Birch, Stewart, Kolasch & Birch, LLP (57) ABSTRACT

To ensure that a down frame in an off-road motorcycle body frame is lightweight, rigid and easy to weld, a down frame extending downward obliquely and backward from a main frame ahead of an engine is divided along its length into a down frame front portion and a down frame rear portion. Welding joins these portions, which abut each other in the longitudinal direction. The down frame front portion is a pipe wrought product formed by extrusion molding and the down frame rear portion is a casting. Since the down frame is welded along a straight welding line extending along its length, welding is easy. Since a main joint and a lower joint are provided integrally with the down frame rear portion as a casting, a separate gusset can be omitted.

20 Claims, 8 Drawing Sheets

MOTORCYCLE BODY FRAME STRUCTURE

CROSS-REFERENCE TO RELATED APPLICATIONS

This nonprovisional application claims priority under 35 U.S.C. § 119(a) on Patent Application No. 2006-047581, filed in Japan on Feb. 23, 2006, the entirety of which is incorporated herein by reference.

FIELD OF THE INVENTION

The present invention relates to a motorcycle body frame structure. In particular, the present invention relates to a motorcycle body frame structure, which allows a down frame that is as lightweight as possible to be used, and makes assembly easy.

DESCRIPTION OF BACKGROUND ART

A publicly known motorcycle body frame includes: a head pipe; a main frame extending downward obliquely and backward from it above an engine; a down frame extending downward obliquely and backward ahead of the engine; a lower frame extending longitudinally under the engine with its front end connected with the lower end of the down frame; and a center frame connecting the rear end of the lower frame and the rear end of the main frame vertically, where the down frame and the main frame are connected by a stiffener pipe.

It is also known that for the purpose of reinforcement, gussets formed by forging are welded to the joints of the down frame, formed from a wrought product made by extrusion molding, etc., with the stiffener pipe and with the lower frame (for example, see JP-A No. 2004-256073).

SUMMARY OF THE INVENTION

The down frame is required to provide a relatively high rigidity and a high strength so as to be able to withstand a large load applied from the front wheel to the head pipe. Therefore, if a pipe down frame is formed from a wrought product, a separate gusset must be welded to reinforce it.

However, the use of such a separate gusset implies that a larger number of components must be assembled and assembly is more troublesome and the weight tends to increase. In addition, welding must be at more points during assembly; and welding must be done all around the down frame and stiffener pipe which means that the welding line is curved, and welding is complicated. For this reason, it has been expected that the number of welding points is decreased and the welding line is straighter to make assembly easier. This application is intended to meet this need.

In order to address the above problem, a first aspect of the present invention is directed to a motorcycle body frame structure, wherein a body frame for supporting an engine includes a main frame extending downward obliquely and backward from a head pipe above the engine, and a down frame extending downward obliquely and backward from the head pipe ahead of the engine. The down frame is longitudinally divided into a down frame front portion and a down frame rear portion and the down frame front portion is formed from a wrought product and the down frame rear portion is formed by casting. The down frame front portion and the down frame rear portion are welded along a straight welding line extending along the length of the down frame.

According to a second aspect of the present invention, the down frame includes a main joint connected with the main frame. The main joint is formed integrally with the down frame rear portion by casting.

According to a third aspect of the present invention, the down frame includes a lower joint connected with a front end of a lower frame extending backward under the engine. The lower joint is formed integrally with the down frame rear portion by casting.

According to the first aspect of the present invention, the down frame is longitudinally divided into a down frame front portion and a down frame rear portion. The down frame front portion, which should be tough, is a tough wrought product. The down frame rear portion, which should be rigid, is formed as a rigid and easy-to-shape casting. The down frame front portion and the down frame rear portion are combined. Therefore, the features required of the down frame are achieved and the weight is reduced while the required strength and rigidity are maintained. At the same time the down frame front portion and the down frame rear portion are welded along a straight welding line along the length of the down frame, making welding simpler.

According to the second aspect of the present invention, the main joint as a connection with the main frame is formed integrally with the down frame rear portion by casting. Therefore, wider latitude in the shape of the main joint is ensured and reinforcement by a separate, welded gusset is not needed.

According to the third aspect of the present invention, the lower joint as a connection between the down frame and the lower frame is formed integrally with the down frame rear portion by casting. Therefore, wider latitude in the shape of the lower joint is ensured and reinforcement by a separate, welded gusset is not needed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment will now be described with reference to the accompanying drawings, wherein the same or similar elements will be identified with the same reference numeral throughout the several views.

Figure 1:
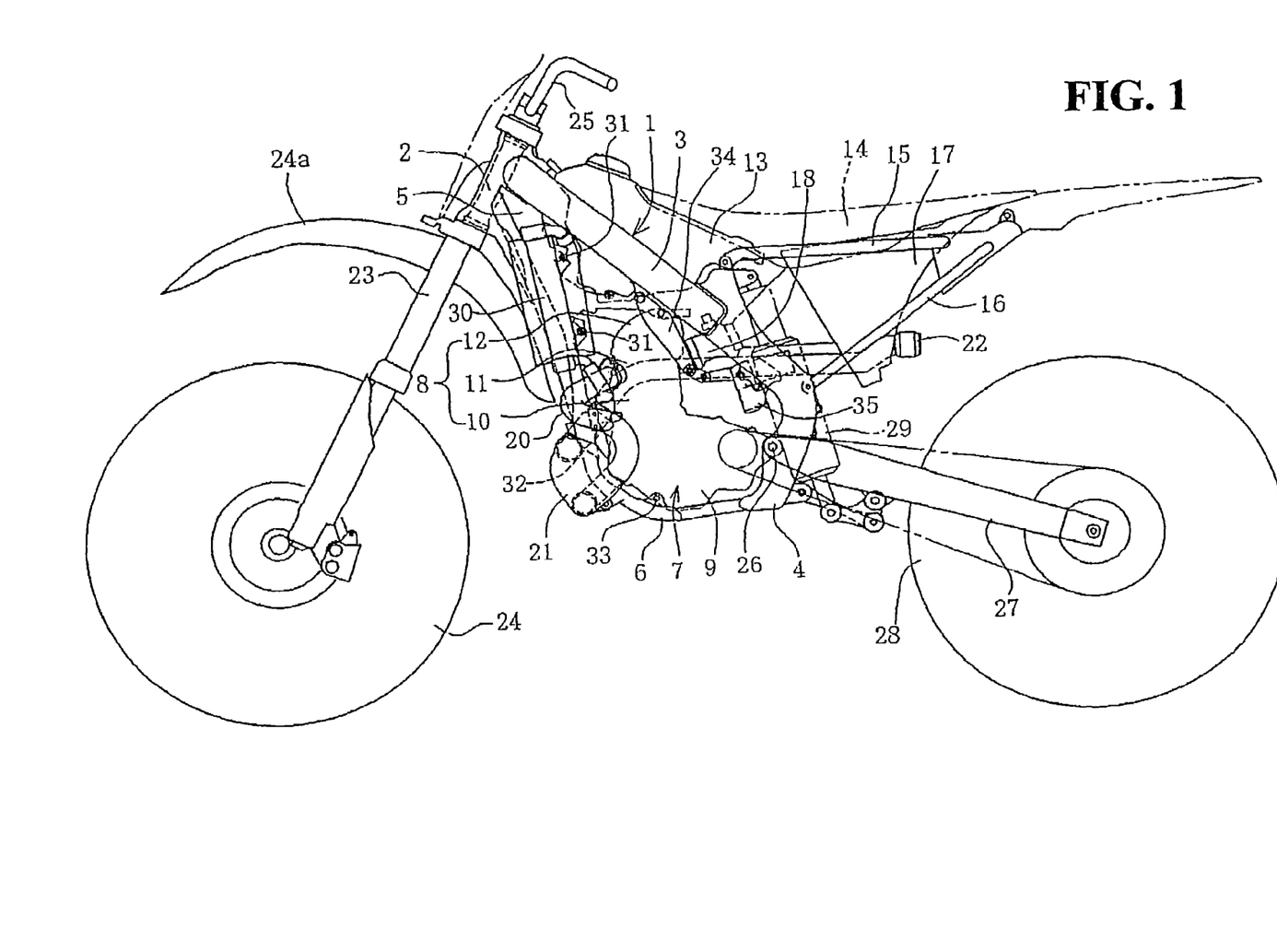
FIG. 1 is a side view of the motorcycle according to an embodiment.

FIG. 1 is a side view of an off-road motorcycle to which the body frame structure according to this embodiment is applied. The body frame 1 of this motorcycle includes a head pipe 2, a main frame 3, a center frame 4, a down frame 5 and a lower frame 6, which are connected in a loop-like manner with an engine 7 held inside the loop. The constituent parts of the body frame 1 are each made of appropriate metal materials such as aluminum alloy. The head pipe 2 and the center frame 4 are castings. The main frame 3 and the lower frame 6 are square pipe wrought products made by extrusion molding. The down frame 5 is a combination of a wrought product and a casting and will be described in detail below.

The main frame 3 extends straight downward obliquely and backward above the engine 7 and joins the upper end of the center frame 4 extending vertically behind the engine 7. The down frame 5 extends downward obliquely ahead of the engine 7 with its lower end connected to the front end of the lower frame 6. The lower frame 6 curves from the front lower portion of the engine 7 to an area under the engine 7 and then extends almost straight backward with its rear end connected to the lower end of the center frame 4.

The engine 7 is a water-cooled 4-cycle engine with a cylinder 8 and a crankcase 9. The cylinder 8, almost in an upright position, includes a cylinder block 10, a cylinder head 11 and a head cover 12.

A fuel tank 13 is located above the engine 7 and held on the main frame 3. Behind the fuel tank 13 is a seat 14, which is held on a seat rail 15 extending backward from the upper end of the center frame 4. Reference numeral 16 represents a reinforcing pipe located under the seat rail 15. The seat rail 15 and the reinforcing pipe 16 support an air cleaner 17 and air is taken into the cylinder head 11 through a throttle body 18 from behind the body.

An exhaust pipe 20, extending downward from the front of the cylinder head 11 ahead of the cylinder 8, is connected to the muffler 21 located in front of the crankcase 9. From the muffler 21, a tail pipe 22 extends backward, crossing the center frame 4 behind which its rear end is supported by the reinforcing pipe 16.

The head pipe 2 supports a front fork 23 and a front wheel 24 supported by its lower end is steered by a handlebar 25. The center frame 4 swingably supports the front end of a rear arm 27 through a pivot shaft 26. A rear wheel 28 is supported by the rear end of the rear arm 27 and driven through a chain by the engine 7. A cushion unit 29 as a rear suspension is provided between the rear arm 27 and the rear end of the center frame 4.

Reference numeral 30 represents a radiator; 31 a rubber mounting part for the radiator; 32 and 33 engine mounting parts; 34 an engine hanger; and 35 an electric component case. The engine 7 is also supported by the center frame 4 through the pivot shaft 26.

Figure 2:
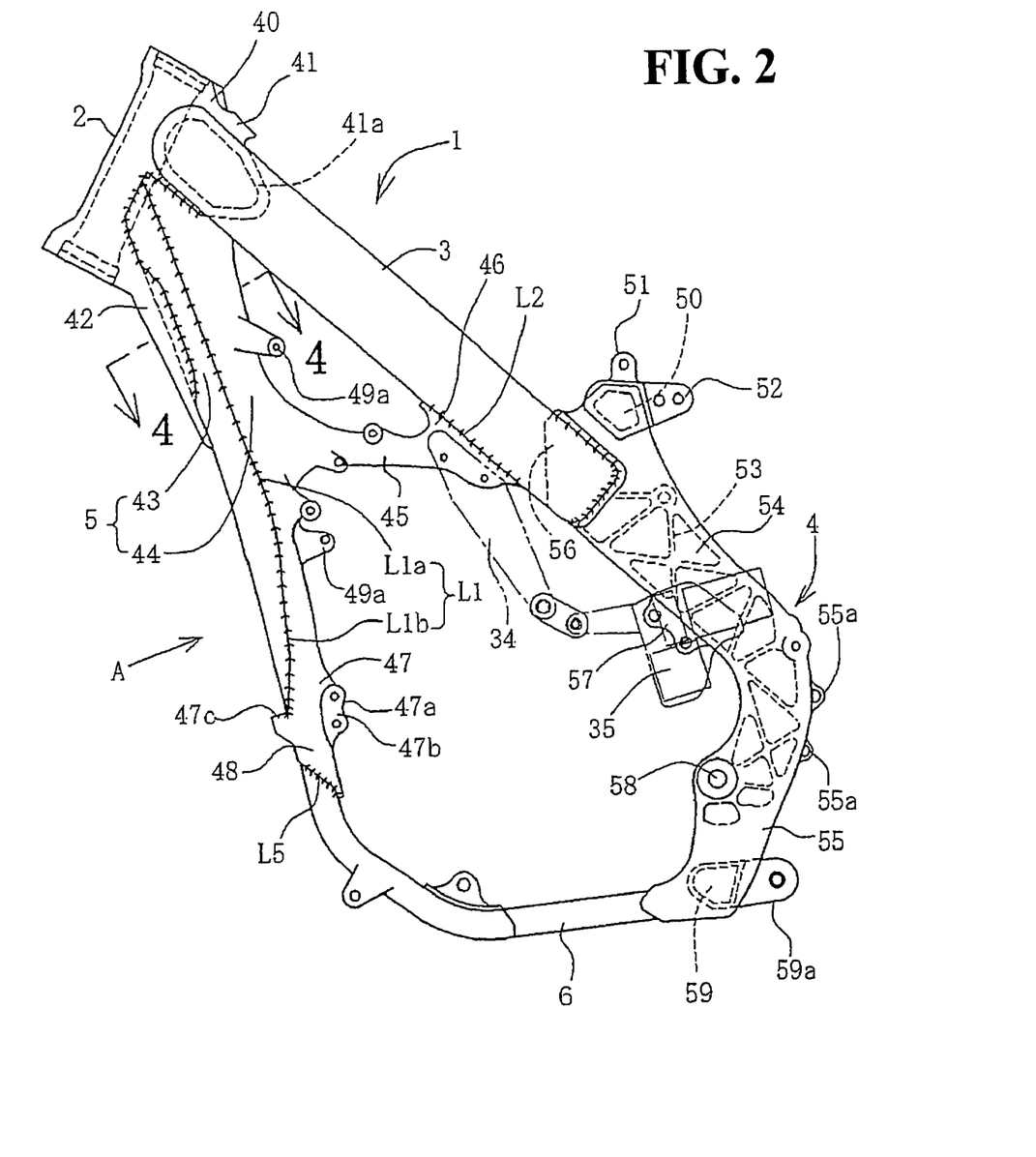
FIG. 2 is a side view of the body frame.

FIG. 2 is a side view of the body frame 1. The head pipe 2 is an integrally formed cylindrical part of a cast head unit 40. The head unit 40 integrally has an upper gusset 41 and a lower gusset 42 which extend backward. The upper gusset 41 is formed integrally with a cross part 41a.

The front end of the down frame 5, abutting on a side upper portion of the head unit 40, is welded thereto and also to the upper gusset 41, overlapping a side surface of the cross part 41a. The front end of the down frame 5, abutting on a side lower portion of the head unit 40, is welded thereto and also to the lower end of the cross part 41a and the lower gusset 42.

The down frame 5 is, along its length, longitudinally divided into separate parts, a down frame front part 43 and a down frame rear part 44, which are integrally welded to each other where its welding line L1 runs along on the side surface of the down frame 5 along its length. The upper half of this welding line L1 forms a straight part L1a and its lower half forms a large-radius curvature part L1b, reaching the front surface in the vicinity of a lowerjoint 47 at the lower end.

From the middle of the down frame rear part 44 in the vertical direction, a stiffener 45 extends backward integrally, in the form of a hollow arm. The joint between the down frame rear part 44 and the stiffener 45 is curved with a relatively large radius and vertically converges toward the direction of extension of the stiffener 45.

At the rear end of the stiffener 45, an integral expanded main joint 46 is welded to a lower surface of the down frame 5 integrally. This welding line L2 represents full-circled welding around the entire periphery of the main joint 46. A seat for mounting an engine hanger 34 is formed on a side surface of the main joint 46.

The lower joint 47, which is divided into two branches, is provided below the down frame 5 integrally with the down frame rear portion 44. The front ends of a left and a right lower frame 6 are welded to a pair of branches 48, respectively. The lower joint 47 has a boss 47a on which a seat 47b for the engine mounting part 32 (FIG. 1) is formed. 49a is a stay for a rubber mounting part 31 of a radiator (FIG. 1).

A cross part 50 is integrally provided on the upper end of the center frame 4 and seat rail mounting stays 51 protruding upward on its left and right and a cushion mounting stay 52 protruding backward in the middle in the transverse direction are each integrally formed.

The center frame 4 is a casting reinforced by many ribs 53 (exposed inward in the vehicle body) arranged in a lattice pattern where an upper portion 54 extending downward obliquely and backward as an extension from the down frame 5 and a lower portion 55 curving from its back and extending downward obliquely and forward are continuously and integrally formed with each other.

Reference numeral 56 represents a mounting seat formed on the front end of the upper portion 54, and the rear end of the down frame 5 is placed upon it and its periphery is welded. Reference numeral 57 represents a mounting seat for the electric component case 35. Reference numeral 58 represents a boss for a pivot shaft 26 provided in the middle of the lower portion 55. Reference numeral 55a represents a mounting stay for the reinforcing pipe 16; 59 a cross member; and 59a a stay for a cushion link.

Figure 3:
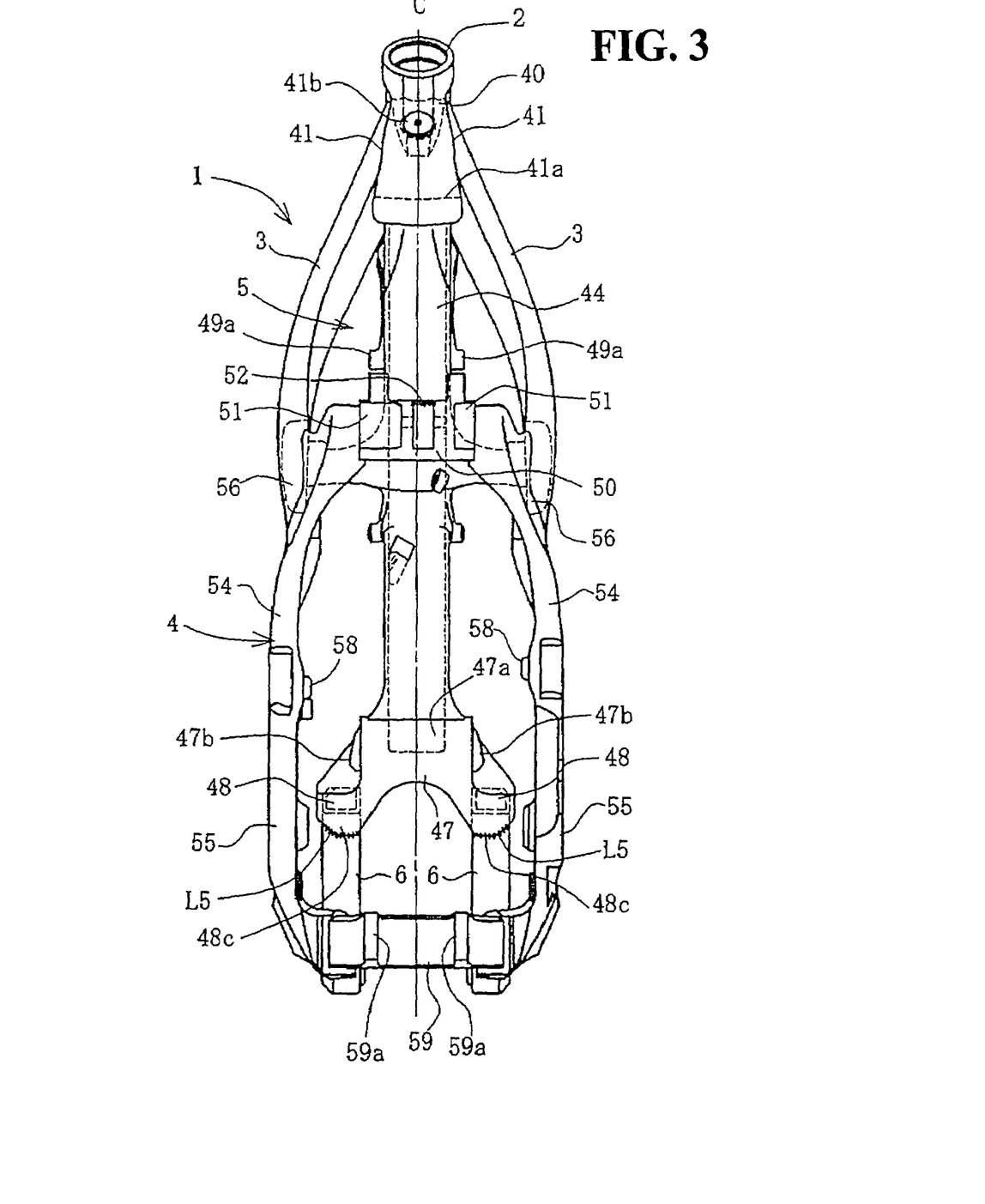
FIG. 3 is a back view of the body frame.

FIG. 3 is a view showing the body frame 1 as seen from behind the vehicle body. Left and right main frames 3, center frames 4 and lower frames 6 are provided in pairs. The front ends of the left and right main frames 3 are connected with the head unit 40. The cross part 41a, extending backward from the head pipe 2, is fitted between the front ends of the left and right main frames 3. The portion of the cross part 41a protruding transversely constitutes the upper gusset 41 and these are integral with the head unit 40. Reference numeral 41b represents a seat for mounting the front end of the fuel tank 13, which is formed above the cross part 50.

The down frame 5 is singly disposed vertically along vehicle body centerline C with the lower joint 47 at its lower end connected with the front ends of the left and right lower frames 6. The rear ends of the left and right lower frames 6 are connected with the lower end front parts of the left and right center frames 4. The cross member 59 is laid and welded between the lower end rear parts of the left and right center frames 4 and the link stay 59a is placed on the cross member 59.

Figure 4:
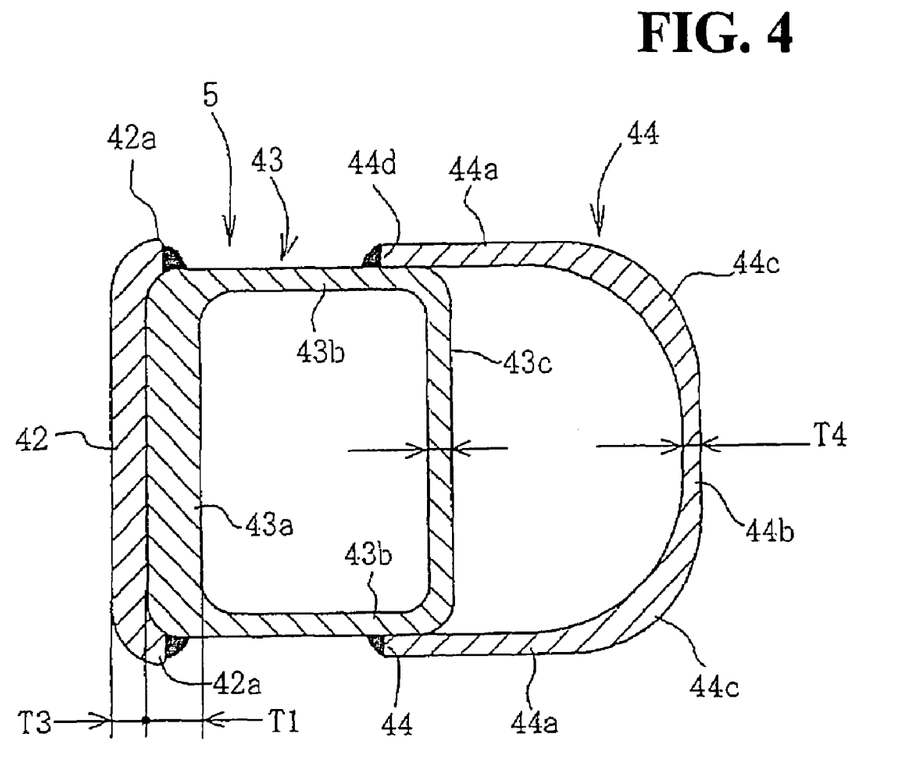
FIG. 4 is a sectional view taken along the line 4-4 in FIG. 2.

FIG. 4 is a sectional view taken along the line 4-4 in FIG. 2 showing that the down frame front portion 43 is formed from a square pipe wrought product and only its front part 43a is a thick-walled part with wall thickness T1. The other parts, namely left and right side parts 43b and a rear part 43c, have a similar wall thickness T2, and T2 is smaller than T1. An uneven thickness structure like this can be made easily by extrusion molding, etc.

The front part 43a closely overlaps the lower gusset 42 in front thereof and welding is done on outer surfaces of the front part 43a. The lower gusset 42 has wall thickness T3 which is almost in the middle between T1 and T2 (T1>T3>T2) and its left and right ends 42a curve backward and with these ends overlapping the outer surfaces of the front part 43a, fillet welding is done along the front ends of the left and right ends 42a.

The down frame rear portion 44 has an almost U-shaped cross section which is open forward, and with the front ends 44d of the left and right side parts 44a overlapping the rear outer surfaces of the left and right side parts 43b of the down frame front portion 43, fillet welding is done along the front ends 44d. The rear part 44b of the down frame rear portion 44 is away from, and behind, the rear part 43c of the down frame front portion 43. The cross section of the down frame 5, consisting of the down frame front portion 43 and the down frame rear portion 44, virtually takes the shape of a Chinese character "hi" meaning "day" (a rectangle with a center line inside).

The rear part 44b of the down frame rear portion 44 has the thinnest wall thickness T4 in the middle in the transverse direction and T4 is almost equal to, or smaller than, T2. The wall thickness gradually increases from this thinnest part toward corners 44c with the side parts 44a. The corners 44c have the largest thickness in the down frame rear portion 44 and this wall thickness is almost equal to T2. The wall thickness again decreases from the corners 44c towards the side parts 44a and the wall thickness of the side parts 44a is almost equal to T4 or slightly larger than T4.

This thin-walled structure of the down frame rear portion 44 contributes to minimizing the weight while ensuring the required rigidity of the rear half of the down frame 5. In other words, the side parts 43b and rear part 43c of the down frame front portion 43 as a wrought product are thin and at the same time the rear part 43c closes the front opening of the down frame rear portion 44 to make a square pipe high-rigidity structure and furthermore through combination with the thin-walled down frame rear portion 44, featuring high rigidity as the inherent nature of a casting, high rigidity and lightness are achieved. In addition, since only the corners 44c are thick, the rigidity and lightness of the down frame rear portion 44 can be efficiently increased.

On the other hand, the down frame front portion 43 contributes to maintenance of the required strength of the front half of the down frame 5. In other words, only the front parts 43a are thick. Taking advantage of the feature of a wrought product, high strength is prioritized over rigidity in the down frame front portion 43's front part which is not reinforced by the down frame rear portion 44. Since high rigidity must be maintained only in the joint with the head pipe 2, placing the lower gusset 42 as a casting upon it reinforces it.

Thus the front part of the down frame 5 is a high-strength part while its rear part is a high-rigidity part. This combination of a high-strength part and a high-rigidity part results from the need for the down frame 5 to function primarily so that its front part withstands a large bending load and its rear part withstands a large compressive load. Hence, the strength of the front part of the down frame 5 and the rigidity of its rear part are designed to meet the need satisfactorily.

Figure 5:
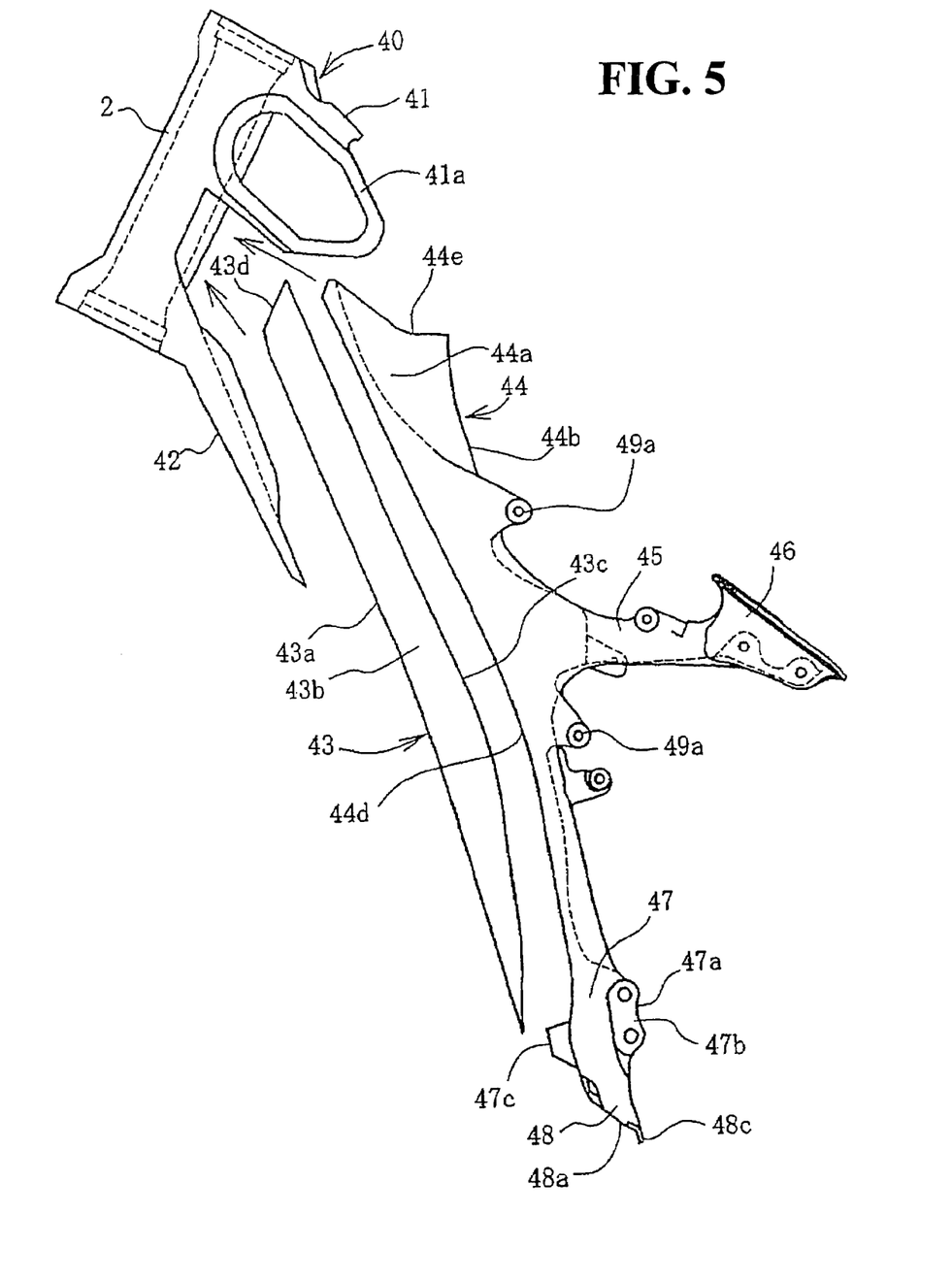
FIG. 5 is an exploded side view of the lower frame.

FIG. 5 is an exploded side view of the down frame 5. The upper end 43d of the down frame front portion 43 is cut obliquely and the upper end 43d is welded in a manner that it is almost parallel to the axis line of the head pipe 2 and abuts on the side surface of the head unit 40. The front part 43a of the down frame front portion 43 vertically extends almost linearly. In the rear part 43c of the down frame front portion 43, the upper half is almost linear and almost parallel to the front part 43a and the width of the side 43b of this part is virtually constant. The lower half of the rear part 43c curves in a manner to come closer to the front part 43a with the side 43b tapered downward. This part is formed, for example, by cutting in a curve or pressing down forward from the back.

In the front end 44d as the front edge of the side part 44a of the down frame rear portion 44, the upper half is linear and the lower half is curved in a manner to fit and overlap the rear part 43c. The contours of the rear part 43c and the front-end 44d, which are shown as seen sideways, coincide with the welding line L1 (FIG. 2). The upper end 44e of the down frame rear portion 44 is curved in a manner to fit the upper gusset 41 and the lower end of the cross part 41a of the head unit 40 as seen sideways.

Figure 6:
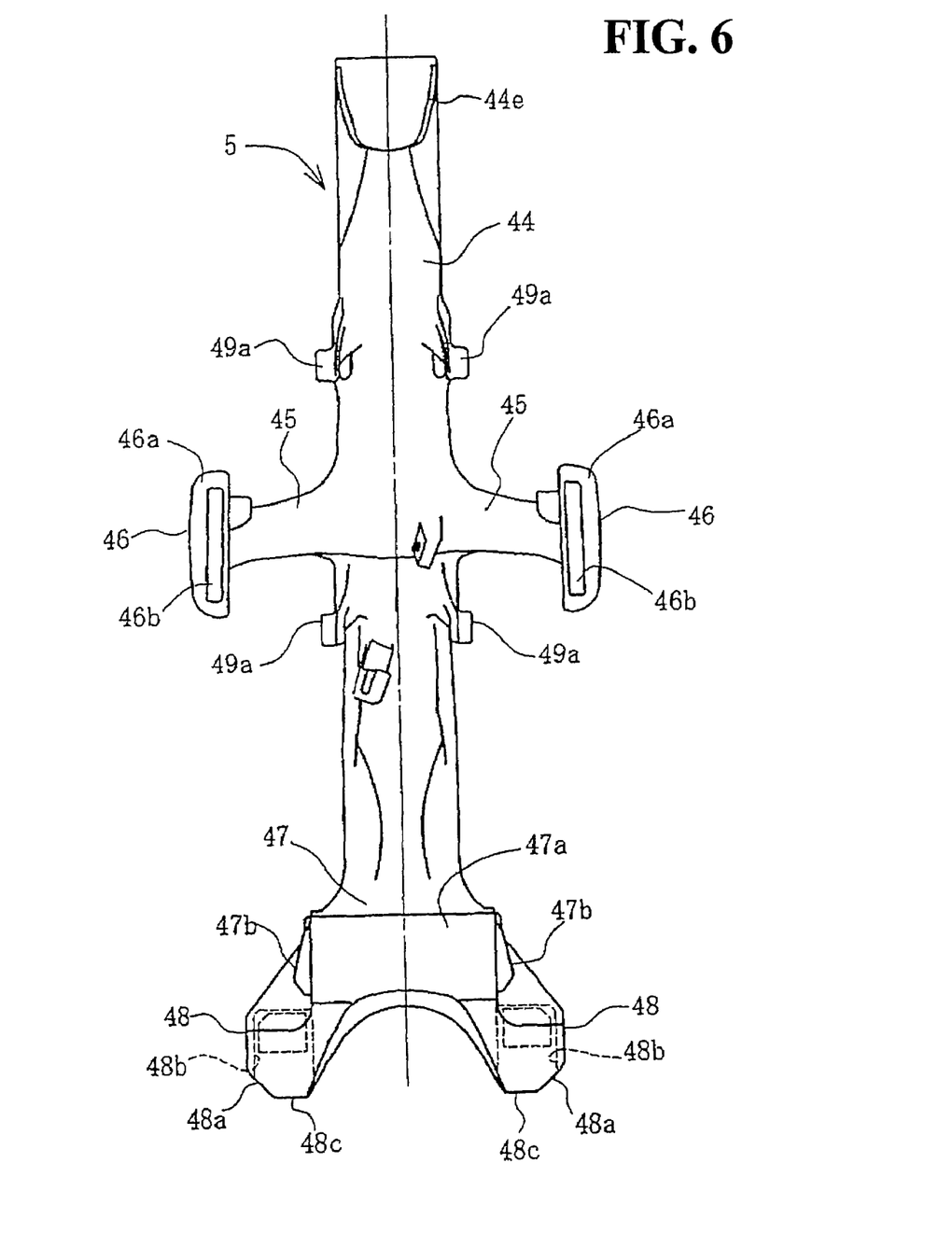
FIG. 6 is a back view of the down frame rear portion.

FIG. 6 is a view of the down frame 5 as seen from behind the vehicle body (other components such as the main frames are omitted from FIG. 3). The middle portion in the vertical direction branches into a left and a right stiffener 45 like arms, with the tips connected with the lower surfaces of the main frames 3. The main joint 46 is formed as an expanded part at each tip of the stiffeners 45 extending left and right like arms, where a hollow or recess 46a is formed in the center. The main joints 46 and the stiffeners 45 are symmetrical transversely and the surfaces of the main joints 46 are contact surfaces 46b, which abut on the lower surface of the down frame 5.

The lower end portion of the down frame 5 constitutes a lower joint 47 whose shape is almost similar to an inverted Y where the lower end bifurcates into a pair of left and right branches 47 and each branch is connected with the front end of each lower frame 6. A boss 47a, protruding backward, is formed on the rear surface of the lower joint 47 and its left and right side surfaces constitute mounting seats 47b for the engine mounting part 32.

The lower edge 48a of each branch 48, constituting a junction end, is inclined down backward as seen sideways (see FIG. 5) where a recess 48b is formed inside this edge and a front end of the lower frame 6 is fitted therein. The rear part of the branch 48 is an overlap 48c, which extends downward slightly along and overlaps a rear surface of the lower frame 5.

Figure 7:
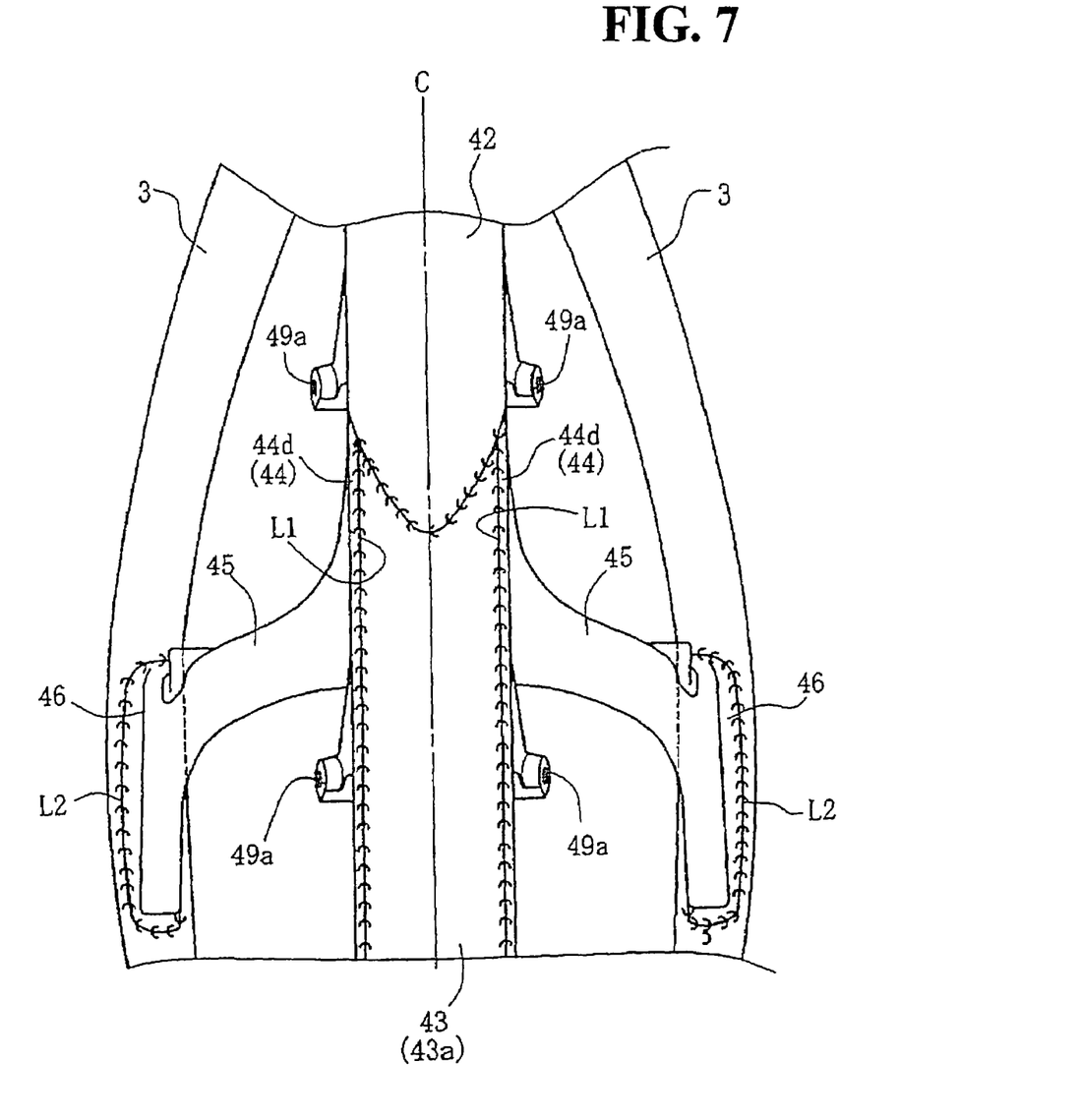
FIG. 7 is a view of a front upper part of the down frame as seen from the direction of arrow A in FIG. 2.

FIG. 7 shows an upper front part of the down frame 5 as seen from the direction of arrow A in FIG. 2. Since the down frame front portion 43 is fitted between the left and right side parts 44a of the down frame rear portion 44, under the lower gusset 42 the left and right tip portions 44d run parallel to each other vertically and along them welding lines L1 run parallel to each other as a left and a right vertical straight line. The main joints 46 abut on the lower surfaces of the main frames 3 and welding lines L2 run around them.

Figure 8:
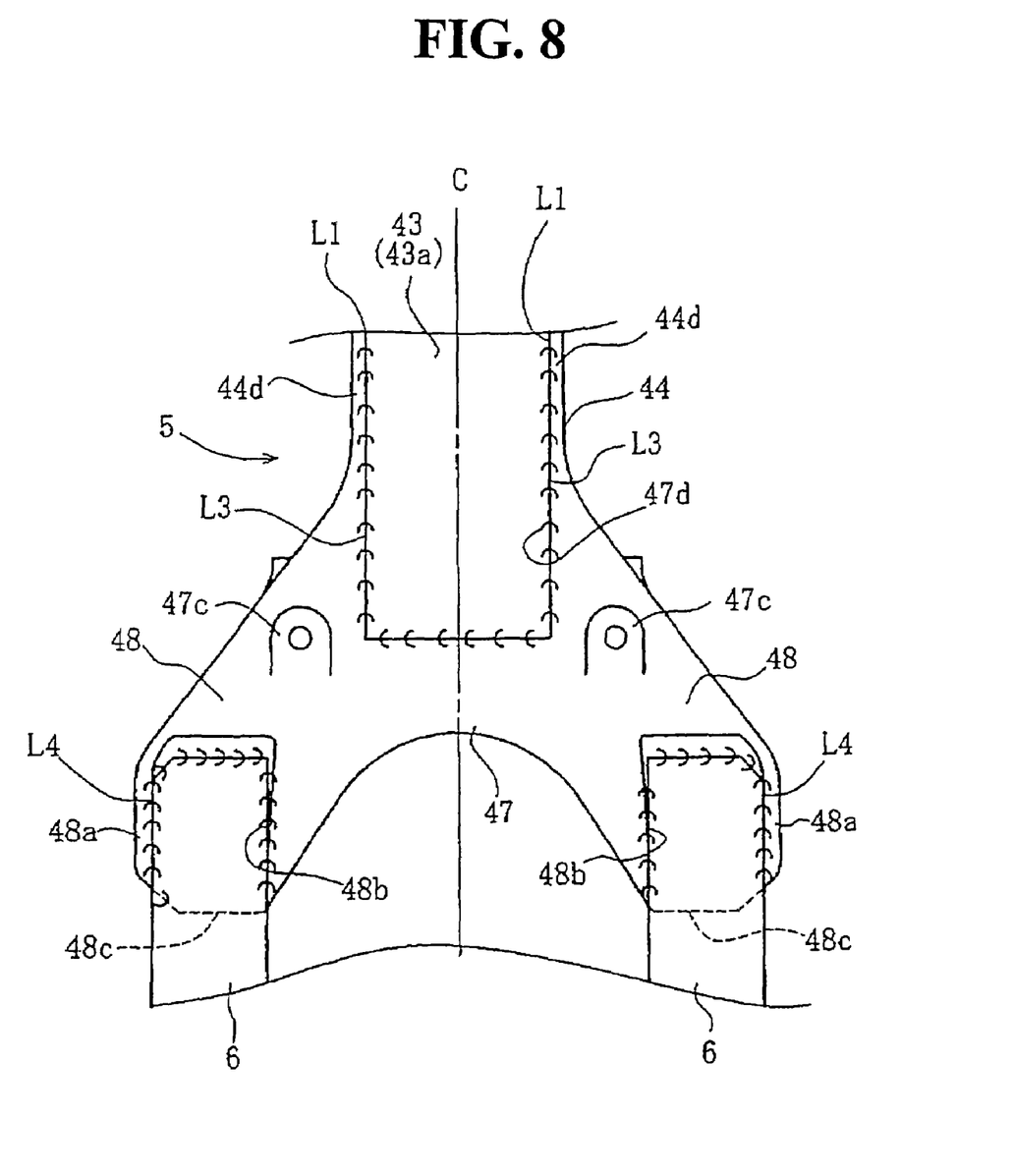
FIG. 8 is a view of a front rear part of the down frame as seen from the direction of arrow A in FIG. 2.

FIG. 8 is a view showing the lower joint 47 as seen from the direction of arrow A in FIG. 2. The lower part of the down frame front portion 43 is almost linear and fitted into the recess 47*d* formed between the left and right edges 44*d* and between extensions of the left and right edges 44*d*, formed in the center of the front of the lower joint 47. The recess 47*d* is open forward and upward and the lower end of the down frame front portion 43 is closely fitted in it and they are connected by welding around them. The welding lines L3 here are simple straight lines that bend at a right angle. The left and right parts of welding lines L3 are extensions of welding lines L1. In other words, the lower parts of welding lines L1 which are invisible as seen sideways (FIG. 2) extend toward the front surface of the lower joint 47 and join welding lines L3.

Recesses 48*b*, which are open forward and downward, are made in the left and right branches 48 and the front ends of the left and right lower frames 6 are fitted therein and welding is done around them. Again welding lines L4 here are simple straight lines that bend at a right angle. Reference numeral 47*c* represents a protruding mounting boss on the front surface of the lower joint 47 and the upper portion of the muffler 21 is held there (FIG. 1).

The branches 48 and the lower frames 6 are joined by full-circled welding, or welding all around the lower frames 6, where welding lines L4 extend sideward and, as shown in FIG. 2, join welding lines L5 along the junction edge 48*a* and the overlap 48*c*.

The function of this embodiment will now be described. Prior to assembling the body frame 1, the down frame 5 is first prepared as shown in FIG. 5. The down frame front portion 43 and the down frame rear portion 44 are put together longitudinally and welding is done along the junction. Welding lines L1 (FIGS. 2 and 7) are almost linear on the side surface of the down frame 5 along its length, so that welding is simple and easy. In addition, the lower half is curved with a large radius, so that it is easy to weld it continuously with the straight upper half.

In addition, since the lower joint 47 is integrally formed on the lower end of the down frame rear portion 44 by casting, it is unnecessary to provide a separate gusset as used in the past, at the joint with the lower frame 6, and thus the number of components is reduced, eliminating the need for welding the down frame and the gusset. Wide latitude in the shape and high rigidity are ensured for the lower joint 47 through casting. It is also easy to weld the lower end of the down frame front portion 43 and the lower joint 47 because welding is done along straight and simple welding lines L3 as shown in FIG. 8.

The front ends of the down frame 5 and the main frames 3, abutting on side faces of the head unit 40, are welded together with the upper gusset 41 and the lower gusset 42. Furthermore, as shown in FIG. 2, the main joints 46 of the left and right stiffeners 45, abutting on the lower surfaces of the left and right main frames 3, are welded. Since the stiffeners 45 are integral with the down frame rear portion 44, there is no need to take the trouble of welding the stiffener pipe and the down frame through a gusset as in the past.

Therefore, a gusset in the stiffener as used in the past can be omitted and the number of components can be decreased and relevant troublesome welding can be eliminated so that assembly is easier. The use of a casting technique gives wide latitude in the shape of the down frame rear portion 44 including the stiffeners 45 and ensures high rigidity. Although full-circled welding is needed to weld the main joints 46 to the main frames 3 as in the past, welding is still easier because of the absence of a gusset.

Also as shown in FIG. 8, the front ends of the lower frames 6 are fitted into the recesses 48*b* of the branches 48 and welding is done around them. Again welding lines L4 and L5 (FIG. 2) are straight, which also makes welding easy.

The main frames 3, center frames 4 and lower frames 6 are welded and connected to obtain the body frame 1 as shown in FIG. 2.

When this body frame 1 is used in the motorcycle as shown in FIG. 1, as a large load is applied to the head pipe 2 from the front wheel 24 side, a large bending load is applied to the front part of the down frame 5 and a large compressive load is applied to the rear part. However, the front part of the down frame 5 uses a high-toughness wrought product for the down frame front portion 43 and thus constitutes a high strength structure so that it can deal with a large bending load, while its rear part to receive a compressive load is a high-rigidity structure which uses the down frame rear portion 44 as a rigid casting so that it can withstand a large compressive load.

In addition, since the down frame 5 is longitudinally divided into a down frame front portion 43 and a down frame rear portion 44 and these are put together to make a structure which combines a high-strength portion and a high-rigidity portion, the down frame 5 provides features suitable for the functions which it should primarily perform and can be as lightweight as possible. Since the down frame 5 as a front part of the body frame 1 is lightweight, when the vehicle body revolves around the head pipe 2, inertial weight around the axis line of the head pipe 2 can be reduced, which is suitable for an off-road motorcycle which requires agile movement of the body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle body frame structure for a motorcycle, comprising:
   a body frame for supporting an engine, said body frame including:
   a main frame extending downward obliquely and backward from a head pipe above the engine; and
   a down frame extending downward obliquely and backward from the head pipe ahead of the engine,
   wherein the down frame is longitudinally divided into a down frame front portion and a down frame rear portion, and the down frame front portion is a wrought product and the down frame rear portion is a cast product, and
   wherein the down frame front portion and the down frame rear portion are welded along a straight welding line that extends along the length of the down frame.

2. The motorcycle body frame structure according to claim 1, wherein the down frame includes a main joint connected with the main frame, and the main joint is formed integrally with the down frame rear portion by casting.

3. The motorcycle body frame structure according to claim 1, wherein the down frame includes a main joint connected with the main frame, and the main joint is formed integrally with the down frame rear portion by casting.

4. The motorcycle body frame structure according to claim 1, wherein the down frame includes a lower joint connected with a front end of a lower frame extending backward under the engine, and the lower joint is formed integrally with the down frame rear portion by casting.

5. The motorcycle body frame structure according to claim 1, wherein the down frame includes a lower joint connected with a front end of a lower frame extending backward under the engine, and the lower joint is formed integrally with the down frame rear portion by casting.

6. The motorcycle body frame structure according to claim 1, wherein said down frame front portion has a cross-section that is generally square in cross-section; and said down frame rear portion has a cross-section that is generally U-shaped cross-section, and front ends of the down frame rear portion overlap the down frame front portion.

7. The motorcycle body frame structure according to claim 6, wherein a front wall of said down frame front portion is thicker than side walls and a rear wall of said down frame front portion, and a rear wall of said down frame rear portion has a thinnest part located at a center thereof, a thickness of the rear wall of said down frame rear portion gradually thickening toward edges thereof.

8. The motorcycle body frame structure according to claim 1, wherein said down frame front portion has a cross-section that is generally square in cross-section; and said down frame rear portion has a cross-section that is generally U-shaped cross-section, and front ends of the down frame rear portion overlap the down frame front portion.

9. The motorcycle body frame structure according to claim 8, wherein a front wall of said down frame front portion is thicker than side walls and a rear wall of said down frame front portion, and a rear wall of said down frame rear portion has a thinnest part located at a center thereof, a thickness of the rear wall of said down frame rear portion gradually thickening toward edges thereof.

10. The motorcycle body frame structure according to claim 1, wherein said down frame rear portion includes a stiffener integrally casted therewith and welded to the main frame.

11. A motorcycle body frame, comprising:
a down frame extending downward obliquely and backward from a head pipe of the body frame, said down frame being longitudinally divided into a down frame front portion and a down frame rear portion, the down frame front portion being a wrought product and the down frame rear portion being a cast product,
wherein the down frame front portion and the down frame rear portion are welded along a straight welding line that extends along the length of the down frame.

12. The motorcycle body frame according to claim 11, wherein the down frame includes a main joint connected with the main frame, and the main joint is formed integrally with the down frame rear portion by casting.

13. The motorcycle body frame according to claim 11, wherein the down frame includes a main joint connected with the main frame, and the main joint is formed integrally with the down frame rear portion by casting.

14. The motorcycle body frame according to claim 11, wherein the down frame includes a lower joint connected with a front end of a lower frame extending backward under the engine, and the lower joint is formed integrally with the down frame rear portion by casting.

15. The motorcycle body frame according to claim 11, wherein the down frame includes a lower joint connected with a front end of a lower frame extending backward under the engine, and the lower joint is formed integrally with the down frame rear portion by casting.

16. The motorcycle body frame according to claim 11, wherein said down frame front portion has a cross-section that is generally square in cross-section; and said down frame rear portion has a cross-section that is generally U-shaped cross-section, and front ends of the down frame rear portion overlap the down frame front portion.

17. The motorcycle body frame according to claim 16, wherein a front wall of said down frame front portion is thicker than side walls and a rear wall of said down frame front portion, and a rear wall of said down frame rear portion has a thinnest part located at a center thereof, a thickness of the rear wall of said down frame rear portion gradually thickening toward edges thereof.

18. The motorcycle body frame according to claim 11, wherein said down frame front portion has a cross-section that is generally square in cross-section; and said down frame rear portion has a cross-section that is generally U-shaped cross-section, and front ends of the down frame rear portion overlap the down frame front portion.

19. The motorcycle body frame according to claim 18, wherein a front wall of said down frame front portion is thicker than side walls and a rear wall of said down frame front portion, and a rear wall of said down frame rear portion has a thinnest part located at a center thereof, a thickness of the rear wall of said down frame rear portion gradually thickening toward edges thereof.

20. The motorcycle body frame according to claim 11, wherein said down frame rear portion includes a stiffener integrally casted therewith and welded to the main frame.

* * * * *